United States Patent [19]
Ray

[11] 3,974,591
[45] Aug. 17, 1976

[54] CHUM DISPENSING ATTACHMENT FOR FISHING RIGS

[76] Inventor: Otis Eugene Ray, 10000 Park Blvd., Seminole, Fla. 33542

[22] Filed: Aug. 4, 1975

[21] Appl. No.: 601,519

[52] U.S. Cl. .............................. 43/43.14; 43/44.91; 43/44.99
[51] Int. Cl.² ........................................ A01K 97/02
[58] Field of Search ............ 43/44.99, 42.06, 44.91, 43/44.9, 41, 43.14

[56] References Cited
UNITED STATES PATENTS

| | | | |
|---|---|---|---|
| 2,958,153 | 11/1960 | Yerman et al. ................... | 43/44..91 |
| 3,019,546 | 2/1962 | Hansen .............................. | 43/44.91 |

FOREIGN PATENTS OR APPLICATIONS

| | | | |
|---|---|---|---|
| 286,106 | 9/1968 | Australia ........................... | 43/44.99 |

Primary Examiner—Warner H. Camp
Attorney, Agent, or Firm—B. P. Fishburne, Jr.

[57] ABSTRACT

A perforated chum holder and dispenser is formed in two hingedly connected half sections having snap locking means, whereby the device may be closed around either a fishing line float for top fishing or a line sinker for bottom fishing. The opposite ends of the device are grooved to receive a fishing line or leader with a coacting locking element.

1 Claim, 5 Drawing Figures

U.S. Patent  Aug. 17, 1976  3,974,591
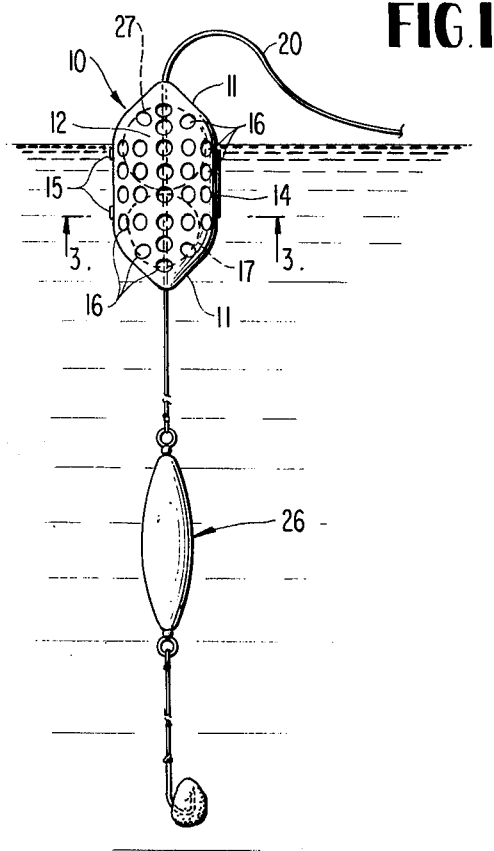
FIG.1
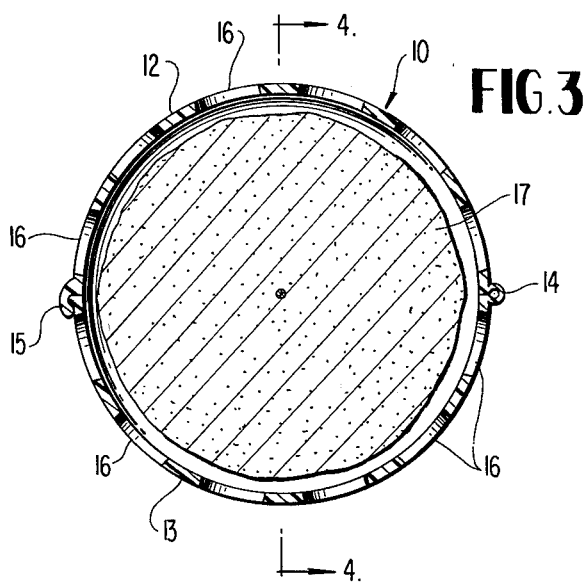
FIG.3
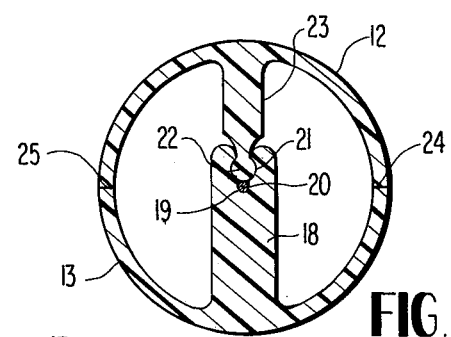
FIG.5
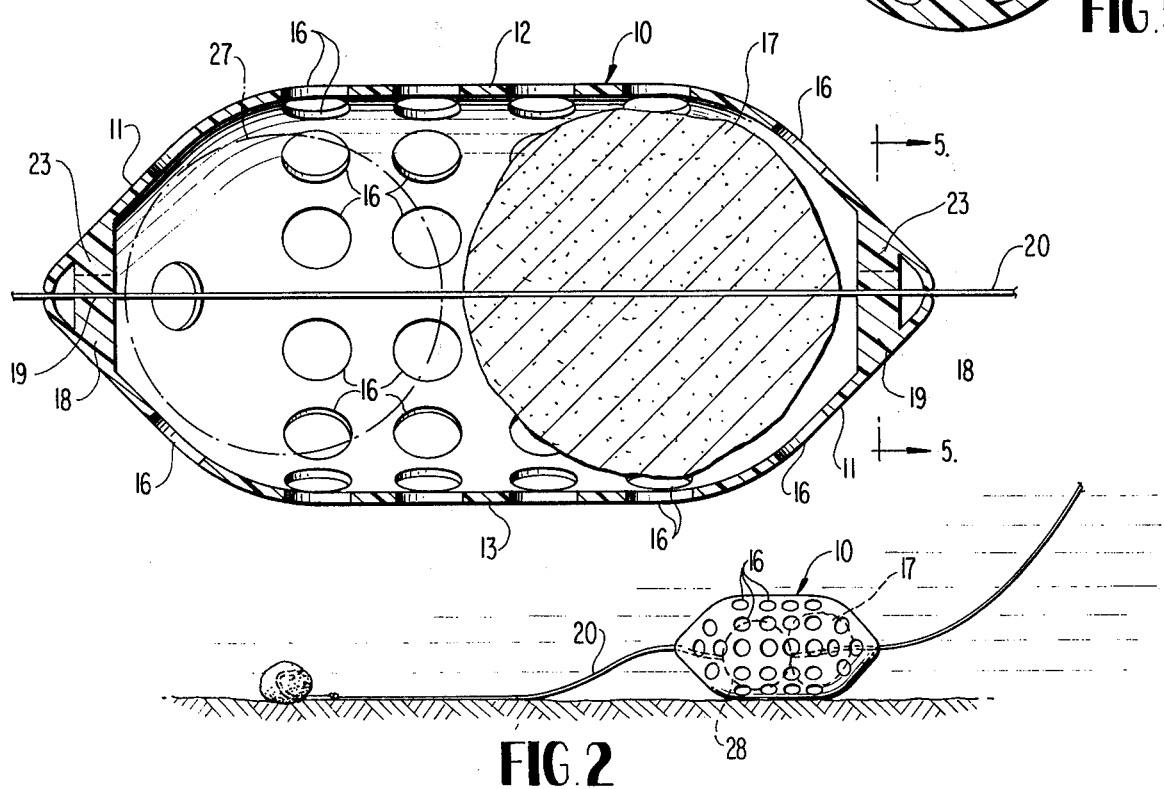
FIG.4
FIG.2

CHUM DISPENSING ATTACHMENT FOR FISHING RIGS

BACKGROUND OF THE INVENTION

The use of chum to attract fish to an area where fishermen have baited their hooks is well known. Customarily, commercial fishermen employ weighted bags or baskets containing chum, which are suspended below their boats in the fishing area. A disadvantage inherent in this procedure is that water currents may carry the less weighty baited rigs to other areas remote from the chum, thus lessening the attractive effect of the chum bag or basket. Also, the use of separate relatively large bags or baskets by individual recreational fishermen is inconvenient and uneconomical.

With the above in mind, the present invention has for its objective to improve on the prior art by providing a chum holder and dispenser which attaches directly to the baited fishing rig, so that regardless of the water current situation in a given locality the chum device will always remain with the fishing rig for maximum efficiency of operation.

Another objective is to provide a chum device of the mentioned type which may be used with equal facility for surface fishing or bottom fishing.

More particularly, the invention comprises a divided relatively small basket-like perforated holder body whose half sections are permanently hinged along one longitudinal side. Snap locking means of an easily releasable type are provided at the opposite side of the holder body to allow closing and locking of the same around a line attached float for surface fishing or a line attached sinker for bottom fishing, the perforated holder body also containing within it a suitable chum mass. Preferably, the device is constructed of a tough semi-rigid plastic which may be clear or colored, as desired. No metallic components are included. The ends of the tapered chum device have grooved line or leader guiding and seating members and cooperating locking and line holding elements.

The invention is characterized by economy of construction and manufacture. It can be applied to any fishing rig and readily removed from the rig when its use is thought not to be required. Hence, the invention is versatile as to usage.

Other features and advantages of the invention will become apparent during the course of the following description.

BRIEF DESCRIPTION OF DRAWING FIGURES

FIG. 1 is a side elevation of the invention in association with a floating fishing rig used for surface fishing.

FIG. 2 is a side elevation of the invention applied to a weighted rig used in bottom fishing.

FIG. 3 is an enlarged horizontal section taken on line 3—3 of FIG. 1.

FIG. 4 is a vertical section taken on line 4—4 of FIG. 3.

FIG. 5 is an enlarged vertical section taken on line 5—5 of FIG. 4.

DETAILED DESCRIPTION

Referring to the drawings in detail, wherein like numerals designate like parts, a chum holder and dispenser 10 forming the subject matter of the invention consists of a hollow somewhat elongated preferably circular cross section perforated basket-like body whose opposite ends are symmetrically conically tapered at 11. The holder body is formed in two semi-circular half sections 12 and 13 permanently joined along corresponding longitudinal edges by a hinge 14. The diametrically opposite longitudinal edges of the half sections 12 and 13 are adapted to be held releasably in abutting relation, FIG. 3, by resilient snap locks 15 which may be formed integrally with the device. Preferably, the entire device is formed of a clear or translucent tough semi-rigid plastic, such material being readily available on the market. Each half section 12 and 13 has evenly spaced perforations 16 distributed over most of its surface so that the chum can readily dissipate into the surrounding water and to prevent air bubbles from remaining inside of the device and thus prevent proper sinking of the device with the chum mass 17 therein.

The opposite end portions of the half section 13 have solid post elements 18 therein and grooved near their tops at 19 for the reception of a fishing line or leader 20. Above the groove 19, an enlarged resilient female locking socket 21 receives a dependent male locking element 22 carried by a post 23 at each opposite end portion of the mating half section 12. This arrangement further secures the device in the closed condition to prevent opening while casting and further locates the line or leader 20 in the positioning grooves 19. When the device 10 is closed, FIGS. 3 and 5, the longitudinal edges 24 and 25 of the two half sections 12 and 13 are in abutting relationship.

During use, on a baited fishing rig such as the floating rig 26 shown in FIG. 1 for surface fishing, the chum holder 10 has its two half sections closed around a line attached float 27 as depicted. During bottom fishing, FIG. 2, the device is closed around a line attached sinker 28. Should it be desired not to employ the invention in a particular situation or when it is required to refill the device with chum, the resilient locking means 15 and 22 are easily separated so that the hinged half sections 12 and 13 may be laid open and the device is easily removed from the line or leader.

The invention is extremely economical, highly simplified in construction and very convenient to employ. It is efficient in operation because of its constant presence on the baited rig as compared to separate and remote chum devices commonly employed. The advantages of the invention will be apparent to those skilled in the art without further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A chum holder and dispenser for use alternately with a float in surface fishing and with a sinker in bottom fishing, said chum holder and dispenser comprising a substantially cylindrical hollow plastic body having symmetrically conically tapered end portions, said body having a multiplicity of perforations arranged to cover a major portion of its total surface, said body formed in two substantially semi-cylindrical half sections and said half sections hingedly connected along corresponding longitudinal edges inwardly of and between the conically tapered end portions, releasable snap fastener means on the opposite corresponding longitudinal edges of said half sections enabling the half sections to be closed around a mass of chum and around either a float element or a sinker element, diametrically opposing integral post elements on the interiors of said conically tapered end portions near the opposite end extremities of said body, the post elements of one half section having longitudinally aligned grooves for the snug reception of a fishing line or leader extending axially through the chum holder and dispenser and said aligned grooves having their axes coinciding with the longitudinal axis of the chum holder and dispenser, said last-named post elements having axially aligned enlarged resilient socket openings immediately above said grooves and slightly laterally offset from the longitudinal axis of the chum holder and dispenser, and coacting locking heads on the post elements of the other half section adapted for snap locking engagement within said sockets when the two half sections are closed and said snap fastener means are engaged, said locking heads then pressing on said fishing line or leader within said grooves.

\* \* \* \* \*